(12) United States Patent
Allan

(10) Patent No.: US 6,737,034 B2
(45) Date of Patent: May 18, 2004

(54) NITRIC ACID PRODUCTION

(75) Inventor: Barry D. Allan, Huntsville, AL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 390 days.

(21) Appl. No.: 09/923,254

(22) Filed: Aug. 2, 2001

(65) Prior Publication Data

US 2003/0026752 A1 Feb. 6, 2003

(51) Int. Cl.[7] .................... C01B 21/38; C01B 21/46
(52) U.S. Cl. .................. 423/394.2; 203/13; 423/390.1; 423/393; 423/394
(58) Field of Search ............... 423/390.1, 393, 423/394, 394.2; 159/DIG. 19; 203/13, 100

(56) References Cited

U.S. PATENT DOCUMENTS

| | | | |
|---|---|---|---|
| 3,876,752 A | * 4/1975 | Wendel | 423/393 |
| 3,927,183 A | * 12/1975 | Oushiba | 423/393 |
| 4,018,872 A | * 4/1977 | Barba et al. | 423/394 |
| 4,018,873 A | * 4/1977 | Barba et al. | 423/393 |
| 4,031,187 A | * 6/1977 | Barba et al. | 423/392 |
| 4,064,221 A | * 12/1977 | Rodrigo et al. | 423/393 |
| 5,500,098 A | * 3/1996 | Brown et al. | 203/13 |
| 5,603,811 A | * 2/1997 | Lucas et al. | 423/294.2 |
| 5,632,866 A | * 5/1997 | Grant | 423/394.2 |
| 6,284,212 B1 | * 9/2001 | O'Brien | 423/393 |

* cited by examiner

Primary Examiner—Wayne A. Langel
(74) Attorney, Agent, or Firm—Dayn T. Beam; Hay Kyung Chang

(57) ABSTRACT

A method process to convert inhibited red fuming nitric acid (IRFNA) and/or nitrogen tetraoxide to either dilute or concentrated (98%+) nitric acid. The method describes a process to remove all of the normal inhibitors (if required), that have been reported to been used in IRFNA. The process described will provide nitric acid free of contaminates which are undesirable when using the nitric acid in reactions to produce other products.

9 Claims, 1 Drawing Sheet

DIAGRAM OF PROCESS STEPS

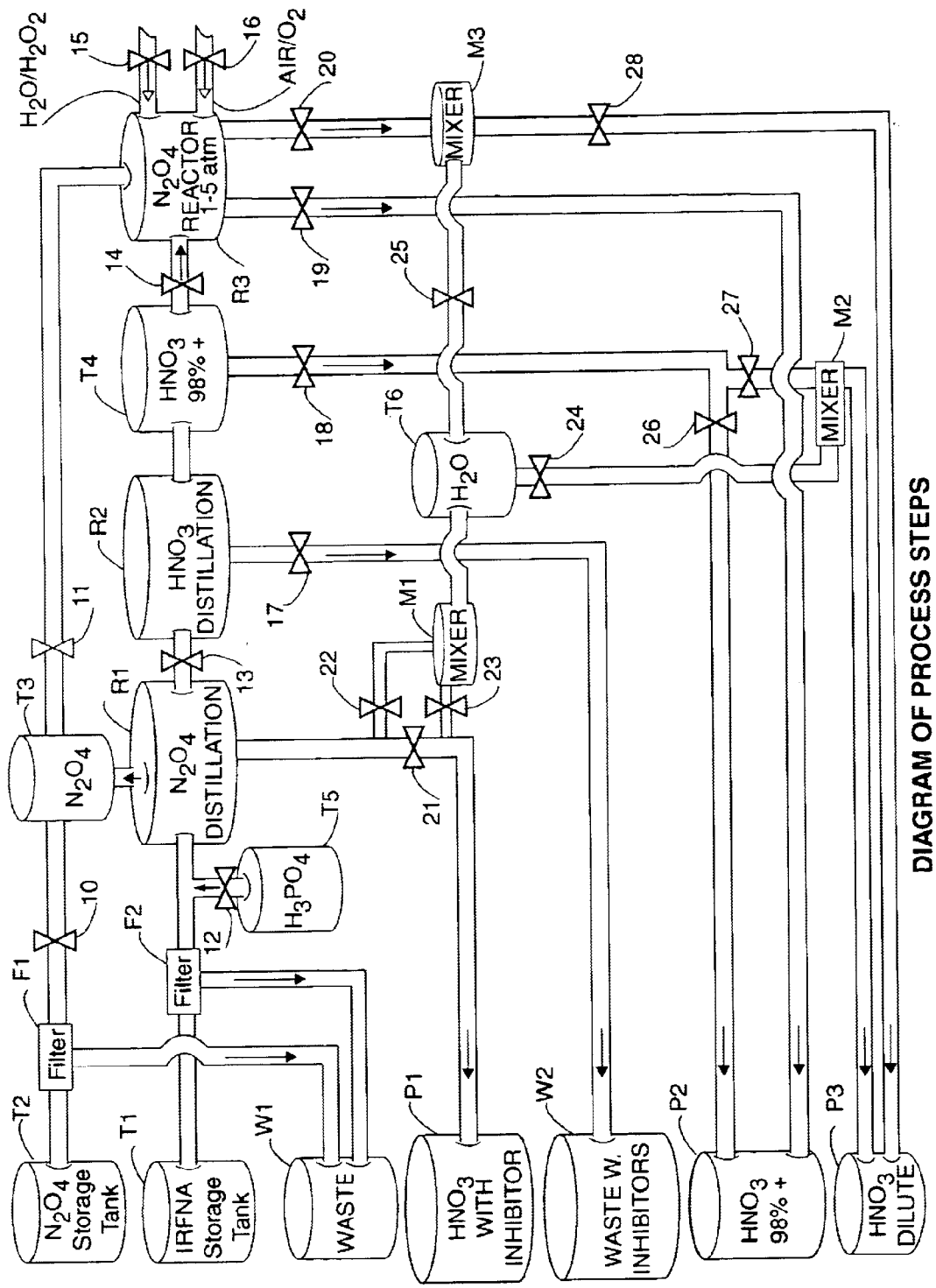
DIAGRAM OF PROCESS STEPS

NITRIC ACID PRODUCTION

NITRIC ACID PRODUCT

The invention described herein may be manufactured, used, and licensed by or for the Government for governmental purposes without the payment to me of any royalties thereon.

BACKGROUND OF THE INVENTION

This invention relates to a unique method of converting Inhibited Red Fuming Nitric Acid (IRFNA) and/or nitrogen tetraoxide to either concentrated (98%+) nitric acid or dilute nitric acid. The unique process includes a process to remove the inhibitors commonly used in Inhibited Red Fuming Nitric Acid (IRFNA). The requirement to remove the inhibitors relates to the end use of the nitric acid. If the requirement to control the inhibitor content is eliminated the steps associated are deleted and the same equipment is used to provide the desired concentration of nitric acid with varying purity and dilution.

The preferred method described below was selected from several options available for each step i.e. sparging or distillation for $N_2O_4$ removal from IRFNA and inhibitor removal via reaction to form solids and/or cooling with separation and filtration. These options might be used under certain conditions depending on the desired end products.

It is therefore an object of this invention to provide nitric acid from (98%+) by weight concentration or dilute nitric acid to any specified concentration.

Another object of this invention is to remove the commonly used inhibitors from IRFNA, if required, to meet the requirements associated with reaction of these inhibitors when they remain in the end product nitric acid.

Yet another object of this invention is to provide a relatively simple conversion process minimizing expensive and time consuming steps.

SUMMARY OF INVENTION

This invention provides a unique process to convert IRFNA and/or nitrogen tetraoxide into nitric acid based on various experimental data never previously combined.

The preferred method steps described below were selected from several options available for each step; i.e., sparging or distillation for $N_2O_4$ removal from IRFNA; and inhibitor removal via reaction to form solids and/or cooling with separation and filtration. These options might be used under certain conditions depending on the desired end products.

BRIEF DESCRIPTION OF THE DRAWING

The FIGURE of the drawing depicts process steps to convert IRFNA-$N_2O_2$ to either concentrated (98%+) nitric acid or dilute nitric acid (any specified concentration with or without removal of any or all common inhibitors).

DESCRIPTION OF THE PREFERRED EMBODIMENT

Process steps to convert IRFNA-$N_2O_4$ to either concentrated (98%+) nitric acid or to dilute nitric acid in any specified concentration (with or without removal of any or all common inhibitors) are depicted in diagram of process steps in the FIGURE of the drawing. Depending on the desired product and the initial starting material some steps may not be needed. Examples of this selection are provided below.

Starting with IRFNA, containing the three common inhibitors (HF, $H_3PO_4$, and $I_2$), but with the requirements that the inhibitors removal is not required, the following steps would be followed. The IRFNA from the storage tank (T1) is passed through the filter (F2) to remove suspended particles. The filtrate is collected in tank (R1) before removal of $N_2O_4$. The $N_2O_4$ is then distilled from the IRFNA and collected in tank (T3).

The requirement to remove the inhibitors is not present. Therefore, these steps have been eliminated and the concentrated acid is transferred through valve 21 to product tank (P1). The concentrated acid can alternately be transferred through valve 22, diluted in mixer M3, and transferred through valve 23 to product tank P1.

The conversion of the $N_2O_4$ to nitric acid to the desired concentration is the next step. $N_2O_4$ from tank T2 and T3 is transferred through valve 10 and valve 11 to tank R3. Enough water to convert $N_2O_4$ to nitric acid and to provide the required end product nitric acid is added in tank (R3). Air/$O_2$ is also added to complete the reaction. The water/nitric acid reaction (heat of solution) is a very exothermic reaction; therefore, care must be taken to control the heat release, i.e., temperature. The water can be added step wise, at one time or slowly during the conversion process. A catalyst, such as $H_2O_2$ may be required to drive the reaction. A multiplate tower (R3) may also be used to increase the contact area of the $N_2O_4$ and water solution. A slight positive pressure of 1–5 atmospheres may be used to enhance the reaction rate.

The nitric acid product from tank (T4) can be added to the product storage tank (P2) as required or to reactor (R3) to allow continued reaction through the addition of water, $N_2O_4$, and air/$O_2$.

If the requirement to remove the three inhibitors is present the following is added to the above process.

The $H_3PO_4$ content is adjusted via tank (T5) to approximately 5–6 times the HF content in reactor (R1). The $N_2O_4$ is then distilled from the IRFNA and collected in tank (T3). The concentrated $HNO_3$ with inhibitors is transferred to reactor (R2) for distillation. The (98%+) $HNO_3$ is condensed into tank (T4). The (98%+) $HNO_3$ can be transferred directly through valve 18 and valve 26 to product tank (P2). $HNO_3$ 98%+ can also be transferred through valve 18 and valve 27 and diluted in mixer (M2) with $H_2O$ from tank (T6) and transferred to product tank (P3) and/or transferred through valve 14 and used in reactor (R3). The waste acid/inhibitor residue is collected in W2 for disposal. In reactor (R3) the $HNO_3$ is diluted to a convenient mix (i.e. 90% acid), $N_2O_4$, $H_2O/H_2O_2$ and air/$O_2$ are reacted at 1–5 atmospheres to produce (98%+) $HNO_3$. This acid can either be transferred through valve 19 to product tank (P2) or through valve 20, diluted in mixer M3, and transferred through valve 28 after dilution to $HNO_3$ (P3).

To convert $N_2O_4$, both obtained from IRFNA or separately, into $HNO_3$, the $N_2O_4$ is either reacted with $H_2O/H_2O_2$ and air/$O_2$ in a multitray tower or with a more dilute (, i.e., 90%) $HNO_3$ solution, $H_2O/H_2O_2$ and air/$O_2$. The (98%+) $HNO_3$ is then transferred through valve 19 to the product tank (P2) or through valve 20, diluted in mixer M3, and transferred through valve 28 to tank (P3) at the proper/required concentration.

The waste products in waste tank (W1) and/or (W2) are neutralized and disposed of in a safe manner.

The process discussed is one capable of converting IRFNA and/or $N_2O_4$ to nitric acid to a wide variety of desired concentrations and purity. It provides a simple practical process to eliminate the common inhibitors found m IRFNA.

I claim:

1. A process for conversion of oxidizers to concentrated nitric acid or dilute nitric acid without the removal of any or all common inhibitors, said process comprising completing the process steps of a–e as follows:
   a. providing separate storage tanks for an oxidizer comprising inhibited red fuming nitric acid (IRFNA-$N_2O_4$) containing inhibitors and an oxidizer comprising nitrogen tetroxide ($N_2O_4$), said storage tanks designated as T1 and T2 respectively, said inhibitors comprising HF, $H_3PO_4$, and $I_2$;
   b. passing said IRFNA-$N_2O_4$ from said tank T1 through a filter F2 to separate waste to waste tank W1;
   c. passing filtrate from said filter F2 through piping means wherein $H_3PO_4$ is adjusted vim a tank T5 to approximately 5–6 times the HF content in the $HNO_3$ with inhibitors;
   d. transferring said $HNO_3$ with inhibitors and added $H_3PO_4$ to reactor R1 for distillation and further processing; and,
   e. distilling $N_2O_4$ from said reactor R1 to a tank T3.

2. A process for conversion of oxidizers to concentrated nitric acid or dilute nitric acid with the removal of any or all common inhibitors, said process comprising completing the process steps of a–g as follows:
   a. providing separate storage tanks for an oxidizer comprising inhibited red fuming nitric acid (IRFNA-$N_2O_4$) containing inhibitors and an oxidizer comprising nitrogen tetroxide ($N_2O_4$), said storage tanks designated as T1 and T2 respectively, said inhibitors comprising HF, $H_3PO_4$, and $I_2$;
   b. passing said IRFNA-$N_2O_4$ from said tank T1 through a filter F2 to separate waste to waste tank W1;
   c. passing filtrate from said F2 through piping means wherein $H_3PO_4$ is adjusted via a tank T5 to approximately 5–6 times the HF content in concentrated $HNO_3$ with inhibitors; which is transferred to reactor R1 for distillation;
   d. distilling $N_2O_4$ from said filtrate to a tank T3;
   e. transferring said filtrate remaining to a reactor tank R2;
   f. distilling $HNO_3$ from said reactor tank R2 to a tank T4 for containing $HNO_3$98%+ for further processing; and,
   g. transferring the waste from said reactor tank R2 to waste with inhibitors tank W2.

3. The process for conversion of oxidizers to concentrated nitric acid or dilute nitric acid without the removal of any or all common inhibitors as defined in claim 1 wherein said $HNO_3$ with inhibitors and added $H_3PO_4$ is transferred to a $HNO_3$ storage tank P1.

4. The process for conversion of oxidizers to concentrated nitric acid or dilute nitric acid without the removal of any or all common inhibitors as defined in claim 1 wherein said $HNO_3$ with inhibitors and added $H_3PO_4$ is transferred to a mixer tank M1reactor wherein said $HNO_3$ with inhibitors and added $H_3PO_4$ is diluted with $H_2O$ prior to being transferred to a $HNO_3$ storage tank P1.

5. The process for conversion of oxidizers to concentrated nitric add or dilute nitric acid with the removal of any or all common inhibitors as defined in claim 2 wherein said $HNO_3$98%+ is transferred to a $HNO_3$98% tank P2.

6. The process for conversion of oxidizers to concentrated nitric acid or dilute nitric acid with the removal of any or all common inhibitors as defined in claim 2 wherein said $HNO_3$98%+ is transferred to a mixer tank M2 wherein said $HNO_3$98% is diluted with $H_2O$ prior to being transferred to a $HNO_3$ dilute tank P3.

7. The process for conversion of oxidizers to concentrated nitric acid or dilute nitric acid with the removal of any or all common inhibitors as defined in claim 2 wherein said $N_2O_4$ is transferred from said tank T3 to a $N_2O_4$ reactor R3 and wherein said $HNO_3$98%+ is transferred from said tank T4 to said $N_2O_4$ reactor R3 for further reacting under pressure of from 1 to 5 atmospheres with $H_2O/H_2O_2$ and air/$O_2$ to yield $HNO_3$98%+.

8. The process for conversion of oxidizers to concentrated nitric acid or dilute nitric acid with the removal of any or all common inhibitors as defined in claim 7 wherein said $HNO_3$98%+ is transferred to $HNO_3$98%+ tank P2.

9. The process for conversion of oxidizers to concentrated nitric acid or dilute nitric acid with the removal of any or all common inhibitors as defined in claim 7 wherein said $HNO_3$98%+ is transferred to a mixer tank M3 wherein said $HNO_3$98% is diluted with $H_2O$ prior to being transferred to a $HNO_3$ dilute tank P3.

* * * * *